(12) United States Patent
Ruiz et al.

(10) Patent No.: US 7,860,860 B2
(45) Date of Patent: Dec. 28, 2010

(54) NAVIGATION OF INTERRELATED HIERARCHIES FOR APPLICATION PERFORMANCE DATA

(75) Inventors: Jon Ruiz, Eagan, MN (US); Carl Seglem, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 363 days.

(21) Appl. No.: 11/561,225

(22) Filed: Nov. 17, 2006

(65) Prior Publication Data

US 2008/0120268 A1    May 22, 2008

(51) Int. Cl.
 *G06F 7/00* (2006.01)
 *G06F 17/30* (2006.01)
(52) U.S. Cl. .................. 707/731; 707/737; 707/738; 707/740
(58) Field of Classification Search .......... 707/737, 707/740, 731, 738
See application file for complete search history.

(56) References Cited

U.S. PATENT DOCUMENTS

| | | | |
|---|---|---|---|
| 6,785,683 B1 * | 8/2004 | Zodik et al. | 707/101 |
| 7,246,128 B2 * | 7/2007 | Jordahl | 707/100 |
| 2004/0054680 A1 * | 3/2004 | Kelley et al. | 707/100 |

* cited by examiner

*Primary Examiner*—John R. Cottingham
*Assistant Examiner*—Mariela D Reyes
(74) *Attorney, Agent, or Firm*—Vierra Magen Marcus & DeNiro LLP

(57) ABSTRACT

Two or more interrelated hierarchies within a set of performance data may be integrated into a single hierarchy. The single hierarchy may be provided in a single user interface to allow a user to navigate the single hierarchy. By navigating through the single hierarchy, a user may view relationships between application elements, cumulative performance data for categories and elements, and other information. A single integrated hierarchy includes a sequence of node types. The node types for an integrated hierarchy may include categories, relationships and elements. The node types may repeat as a sequence within the hierarchy, and more than one node type may be combined into a single level of the hierarchy. Aggregated metrics such as response time may be displayed with the integrated hierarchy.

25 Claims, 12 Drawing Sheets

Figure 5B

|  | Av | RT | Er |
|---|---|---|---|
| Transaction | .9 | 1 | 0 |
| Subsystem | 1 | 9 | 0 |
| Resource | 1 | 1 | 0 |

Figure 5C

|  | Av | RT | Er |
|---|---|---|---|
| Transaction | .9 | 1 | 0 |
| Subsystem | 1 | 9 | 0 |
| S1 | 1 | 8 | 0 |
| S2 | 1 | 1 | 0 |
| S3 |  |  |  |
| Resource | 1 | 1 | 0 |

Figure 5D

|  |  | Av | RT | Er |
|---|---|---|---|---|
| Transaction |  | .9 | 1 | 0 |
| Subsystem |  | 1 | 9 | 0 |
| S1 |  | 1 | 8 | 0 |
|  | Use |  |  |  |
|  | Cause |  |  |  |
|  | Call |  |  |  |
| S2 |  | 1 | 1 | 0 |
| S3 |  |  |  |  |
| Resource |  | 1 | 1 | 0 |

Figure 5E

|  |  |  | Av | RT | Er |
|---|---|---|---|---|---|
| Transaction |  |  | .9 | 1 | 0 |
| Subsystem |  |  | 1 | 9 | 0 |
| S1 |  |  | 1 | 8 | 0 |
|  | Use |  |  |  |  |
|  | Cause |  |  |  |  |
|  |  | Login Transaction | 1 | 7 | 0 |
|  |  | Buy Transaction | 1 | 1 | 0 |
|  | Call |  |  |  |  |
| S2 |  |  | 1 | 1 | 0 |
| S3 |  |  |  |  |  |
| Resource |  |  | 1 | 1 | 0 |

|  |  |  | Av | RT | Er |
|---|---|---|---|---|---|
| Transaction |  |  | .9 | 1 | 0 |
| Subsystem |  |  | 1 | 9 | 0 |
| S1 |  |  | 1 | 8 | 0 |
|  | Use |  |  |  |  |
|  | Cause |  |  |  |  |
|  |  | Login Transaction | 1 | 7 | 0 |
|  |  | Buy Transaction | 1 | 1 | 0 |
|  | Call |  |  |  |  |
| S2 |  |  | 1 | 1 | 0 |
| S3 |  |  |  |  |  |
| Resource |  |  | 1 | 1 | 0 |

Subsystem – Subsystem 2 -Transactions – Cause

|  | Availability | Response Time | Errors |
|---|---|---|---|
| Login Transaction | 1.0 | 7 | 0 |
| Buy Transaction | 1.0 | 1 | 0 |

NAVIGATION OF INTERRELATED HIERARCHIES FOR APPLICATION PERFORMANCE DATA

BACKGROUND

With the development of the Internet, network applications such as web-based applications have evolved in size and capability. With evolvement of the applications, the data that the applications generate and manage has grown as well. Application management systems are used to monitor applications that implement much of the functionality of a network system and web-based service. These application management systems retrieve and manage a large quantity of application management data.

Application management data is interrelated and may contain many hierarchies of data. For example, application management data may include hierarchies of applications, transactions, subsystems, resources used by an application, and other hierarchies. These hierarchies are interrelated through communication, logically, physically, or in some other manner. For example, a "purchase merchandise" transaction may use a credit card processing subsystem which uses resources such as CPU, disk space, etc. These elements are all interrelated.

Typically, systems for displaying application monitoring data for a monitored application provide a structured path of information for a particular type of element. For example, information for a hierarchy of data may be provided in a manner which provides a structured path of application data. In order to view another type of data or reverse relationships between data elements, a user must view an entirely different hierarchy of data or is simply unable to view the desired relationship. For example, a user may view a single hierarchy of application methods used by an application and resources used by the application, but cannot view the methods that call the subsystems from the point of view of the subsystem through the same hierarchy. Thus, different types of interrelated application data are often handled as different sets of data or not provided at all. Further, it is difficult to determine the relationships between the different types of application monitoring data when the data is viewed in separate hierarchies.

SUMMARY

Two or more interrelated hierarchies within a set of performance data may be integrated into a single hierarchy. A user interface allows a user to navigate through the single hierarchy. For example, a user may navigate through the single hierarchy by selecting different categories, relationships, and the elements themselves. By navigating through the single hierarchy, a user may view relationships between application elements, cumulative performance data for categories and elements, and other information.

In one embodiment, a single integrated hierarchy includes a sequence of node types. The node types for an integrated hierarchy may include categories, relationships and elements. Categories may include transactions, subsystems and resources. A transaction category includes elements related to an application. A subsystem category includes elements comprising systems which may be used by an application. A resource category includes anything used or called by a transaction or subsystem category element that is shared and of which there is a limited supply of. Elements may include the elements that exist within each category. Relationships between elements indicate how different elements from the same or different categories are related.

In some embodiments, the node types may repeat as a sequence within the hierarchy. A representative sequence may be category, relationship, and element type nodes, and repeat accordingly. After the node type sequence has occurred once, all or part of the sequence of node types may then repeat. In some embodiments, more than one node type may be combined into a single level of the hierarchy, or exist in some other manner in the hierarchy. For example, an application root node may contain category sub-nodes and one or more relationship sub-nodes which correspond to the root node. The sequence of node types, the manner in which they repeat, and whether more than one type is contained at any level in an integrated hierarchy of performance data may be configured by a user. In some embodiments, a default configuration can be provided by the system.

An integrated hierarchy may be provided in a user interface with metrics. The metrics may indicate information for a node of subsystems, transactions, and other elements. Metrics may include response time, average number of occurrences, and error count. In some embodiments, nodes may include aggregated metrics for their sub-nodes.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIGS. 5B-5E are examples of a user interface as a user navigates through an integrated performance data hierarchy provided by the user interface.

DETAILED DESCRIPTION

Figure 1:
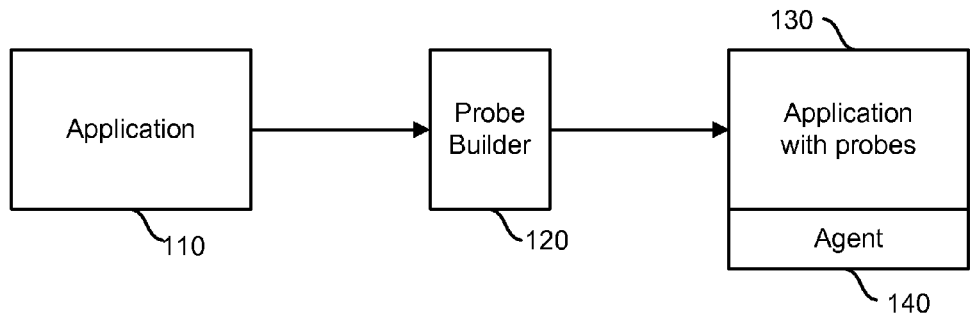
FIG. 1 is an embodiment of a block diagram illustrating how byte code is instrumented.

Two or more interrelated hierarchies within a set of performance data may be integrated into a single hierarchy. A user interface allows a user to navigate through the single hierarchy. For example, a user may navigate through the single hierarchy by selecting different categories, relationships, and the elements themselves. By navigating through the single hierarchy, a user may view relationships between application elements, cumulative performance data for categories and elements, and other information.

Application performance data may be generated for one or more monitored applications. The performance data may contain data reflecting the performance for one or more applications and corresponding application components (response time, error count, and so on), identification information for application components, subsystems and resources, and relationship data. Performance data is discussed in more detail below.

In one embodiment, a single integrated hierarchy includes a sequence of node types. The node types for an integrated hierarchy may include categories, relationships and elements. Categories may include transactions, subsystems and resources. A transaction category includes elements related to an application (e.g., make up a map of an application), such as transaction groups, transactions, transaction components, methods, classes, servlets, EJBs, and so on. A subsystem category includes elements comprising systems which may be used by an application. Examples of subsystem elements include a database type, a database instance, a messaging queue, and other systems. A resource category includes anything used or called by a transaction or subsystem category element that is shared and of which there is a limited supply of. Resource category elements may include disk space, central processing unit (CPU) cycles, network bandwidth, and so on. Elements may include the elements that exist within each category. For example, an EJB is a component category element and is used to process transactions, "Login" is a transaction category, a database is a subsystem category element, and a CPU is a resource category element.

Relationships between elements indicate how different elements from the same or different categories can be related. Examples of relationships include use, cause, call, contain, deploy, and so on. For example, subsystem and component elements call each other, transaction and subsystem components use resources, subsystems contain components, URL requests cause subsystems, and components and methods to be invoked.

In some embodiments, the node types may repeat as a sequence within the hierarchy. A representative sequence may be category, element, relationship, and element nodes, and repeat accordingly. For example, an integrated hierarchy provided in a user interface may contain a root node corresponding to a particular application. The application root node may contain three category sub-nodes. Each category sub-node may contain one or more elements, which contain one or more relationship sub-nodes corresponding to the particular category node. Each relationship sub-node may contain one or more element nodes. Thus, a user can navigate through the integrated hierarchy provided in a user interface to view elements having a particular relationship with a category of transactions, subsystems, or resources. For example, a user could select a "subsystem" category node, select a "cause" relationship sub-node for the subsystem category, and see elements that are "caused" or invoked by the particular subsystem.

After the node sequence has occurred once, all or part of the sequence of nodes may then repeat. For example, if only a portion of the node sequence is to repeat, the relationship-element of the node sequence may repeat. Thus, relationship sub-nodes can be provided for each element. Each relationship sub-node may then have sub-nodes of elements. This level of elements would be related to the previous level of elements according to the relationship sub-node specified between them.

In some embodiments, more than one node type may be combined into a single level of the hierarchy, or exist in some other manner in the hierarchy. For example, an integrated hierarchy may contain a root node of a particular application. The application root node may contain category sub-nodes and one or more relationship sub-nodes which correspond to the root node. In this case, a user could navigate through the hierarchy through either the category sub-nodes or the relationship sub-nodes. The sequence of node types, the manner in which they repeat, and whether more than one type is contained at any level in an integrated hierarchy of performance data may be configured by a user.

In some embodiments, a "transactions" category can optionally be split into two categories: an "applications" category and a "transactions" category. This is useful in expanding the definition of an application beyond a collection of transactions (e.g., my "online storefront" application is comprised of the "login", "search", "browse", "add", "checkout" and "pay" transactions).

In some embodiments, there may be two or more data models utilized in the present technology. A first data model may organize performance data retrieved from one or more applications, as well as the relationships between the performance data. In particular, the generated performance data is stored on a data store. The data store can be queried for performance data. For example, a query may be sent to the data store in response to navigation requests received from a user through a user interface. The data store receives a query for performance data, processes the query, generates a response with the appropriate performance data and provides the response to the requesting entity. The performance data is then provided to a user through the user interface.

The second data model may handle user interface viewing, and describe how an integrated hierarchy progresses and is displayed in a user interface. The second data model, or user interface data model, may query the first data model for performance data or other data required by the user interface but not readily accessible by the user interface data model.

In some embodiments, the user interface data model can contain locally cached copies of some of the data in the first data model (to avoid constant queries to the first data model). There only needs to be one user interface data model that all the views in the user interface can share. This would reduce required memory and has a global cache. In some embodiments, the model could be repeated multiple times—one for each view. In some embodiments, both models could be implemented in the same location, but this may require the user interface model to query the fist model every time it updates the user interface.

An integrated hierarchy may be provided in a user interface with metrics. The metrics may indicate information for a node of subsystems, transactions, and other elements. Metrics may include response time, average number of occurrences, and error count. In some embodiments, the metrics could be user configurable; not all metrics would be used for all tree nodes. For example, if a metric does not apply to a particular tree node, the metric is not calculated or shown for that node. In some embodiments, nodes may include aggregated metrics for their sub-nodes. For example, a subsystem category may cause four transactions to be invoked (i.e., the subsystem category has a sub-node of cause, which has four transactions sub-nodes). Each transaction may have a response time of one hundred milliseconds. The response time of the "cause" relationship causing the four transactions will be displayed as four hundred milliseconds, corresponding to the sum of the response times for the four transactions.

In some embodiments, the metrics retrieved and displayed for performance data in a user interface can be aggregated over any time period, present or historical. This is useful because it allows the technology herein to be used to examine problems that happened in the past as well as live systems.

In some embodiments, the present technology can be used alone or in as a way to select an object in the system to be inspected by other parts of the user interface. This functionality is similar to a tree provided by some Internet browser applications. For example, the left side of an interface can be used to navigate the hierarchy, and select something, then further details show up on the right.

In one embodiment, the technology herein can be used to monitor behavior of an application on an application server using bytecode instrumentation. The technology herein may also be used to access information from the particular application. To monitor the application, an application management tool may instrument the application's object code (also called bytecode). FIG. 1 depicts an exemplar process for modifying an application's bytecode. FIG. 1 shows Application 110, Probe Builder 120, Application 130 with probes and Agent 140. Application 130 includes probes used to access information from the application, and application 110 is the application before the probes are added. Application 110 can be a Java application or a different type of application.

Probe Builder 120 instruments (e.g. modifies) the bytecode for Application 110 to add probes and additional code to Application 110 in order to create Application 130. The probes may measure specific pieces of information about the application without changing the application's business logic. Probe Builder 120 also generates Agent 140. Agent 140 may be installed on the same machine as Application 130 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2:
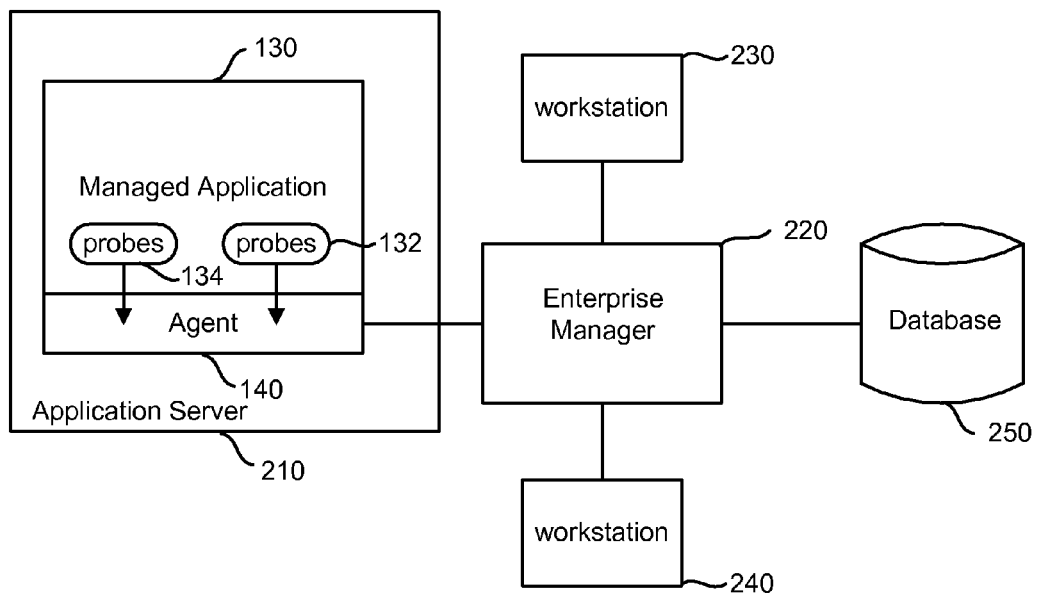
FIG. 2 is an embodiment of a system for monitoring an application.

FIG. 2 is a conceptual view of the components of the application performance management tool. In addition to managed Application 140 with probes 132 and 134, FIG. 2 also depicts Enterprise Manager 220, database 250, workstation 230 and workstation 240. As a managed application runs, probes (e.g. 132 and/or 134) relay data to Agent 140. In one embodiment, probes 132 and 134 may be implemented in objects and other code that write data, change data or otherwise cause the state of an application server to change. Agent 140 then collects, summarizes and sends the data to Enterprise Manager 120.

Enterprise Manager 120 receives performance data from managed applications via Agent 140, runs requested calculations, makes performance data available to workstations 230-240 and optionally sends performance data to database 250 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2, each of the components is running on different machines. That is, workstation 230 is on a first computing device, workstation 240 is on a second computing device, Enterprise Manager 220 is on a third computing device, and Managed Application 130 is running on a fourth computing device. In another embodiment, two or more (or all) of the components are operating on the same computing device. For example, Managed Application 130 and Agent 140 may be on a first computing device, Enterprise Manager 220 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
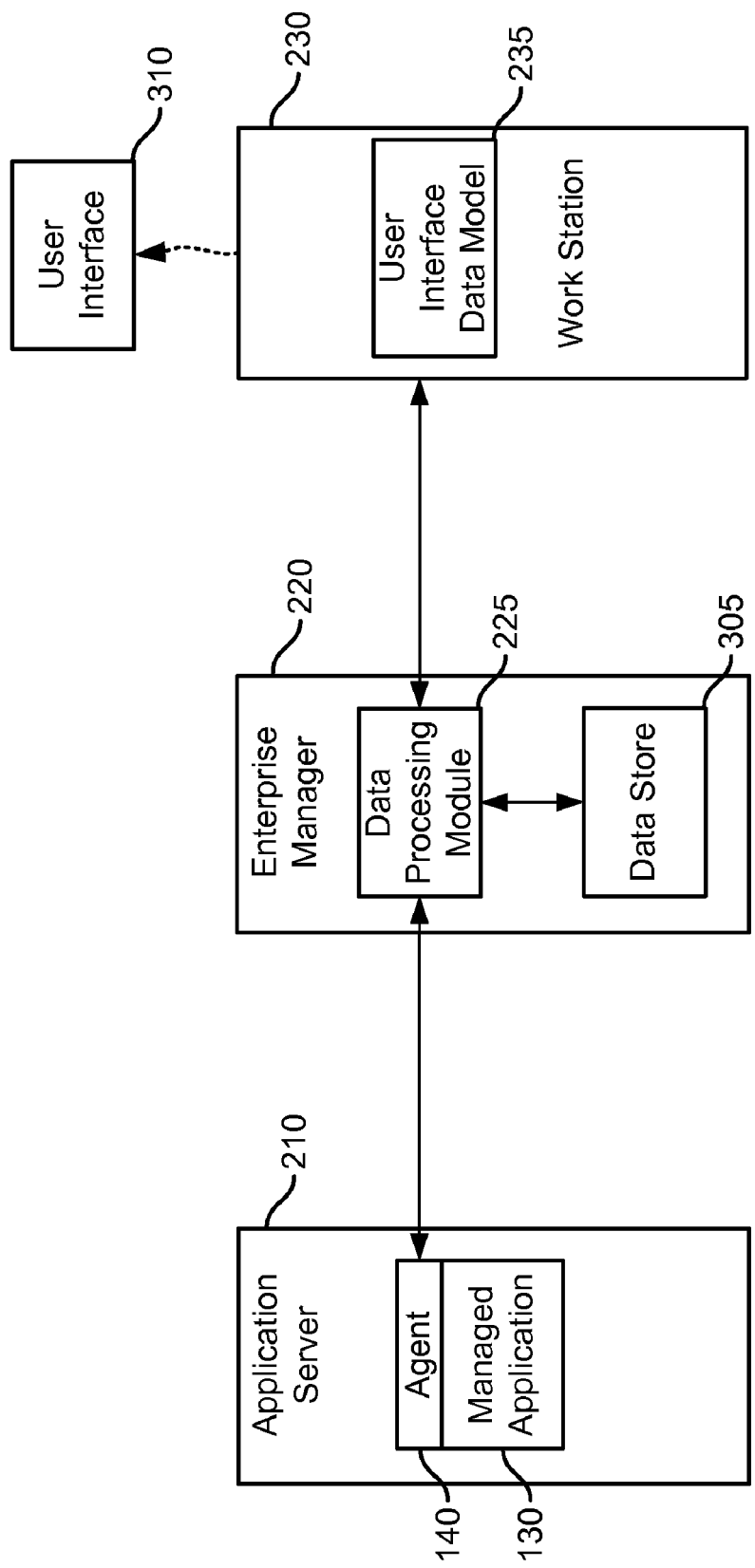
FIG. 3 is an embodiment of a system for managing interrelated hierarchies of performance data.

FIG. 3 is an embodiment of a system for navigating inter-related hierarchies of performance data. The system of FIG. 3 includes application server 210, enterprise manager 220, and workstation 230 as illustrated in FIG. 2. Enterprise manager 220 includes data processing module 225 and data store 305. Work station 230 provides user interface 310.

Data processing module 225 is in communication with agent 140 and data store 305. Data processing module 225 receives performance data from agent 140 and store the performance data to data store 305. Data processing module 225 may also process queries to and from data store 305. Data store 305 may be contained within enterprise manager 305 or some other location. In one embodiment, data store 305 may store performance data received from enterprise manager 220 as well as relationships between the performance data elements. Data store 305 may implement the first data model discussed above.

Workstation 230 may include user interface data model 235, provide user interface 310, and be in communication with data processing module 225. In some embodiments, user interface data model 235 communicates with data processing module 225. Additionally, workstation 230 and/or user interface data model 235 may communicate directly with data store 305 rather than indirectly through data processing module 225. User interface data model 235 may handle user interface viewing, describe how an integrated hierarchy progresses and is displayed in a user interface, and query the first data model for performance data or other data required by the user interface but not readily accessible by the user interface data model. In some embodiments, user interface data model can contain locally cached copies of performance data as well as hard coded lists of data.

User interface 310 is provided by workstation 230. In one embodiment, a user may navigate through interrelated hierarchies of performance data through user interface 310. Examples of user interface 310 are provided in FIGS. 5C-5F and 11B-11C, discussed in more detail below.

Figure 4:
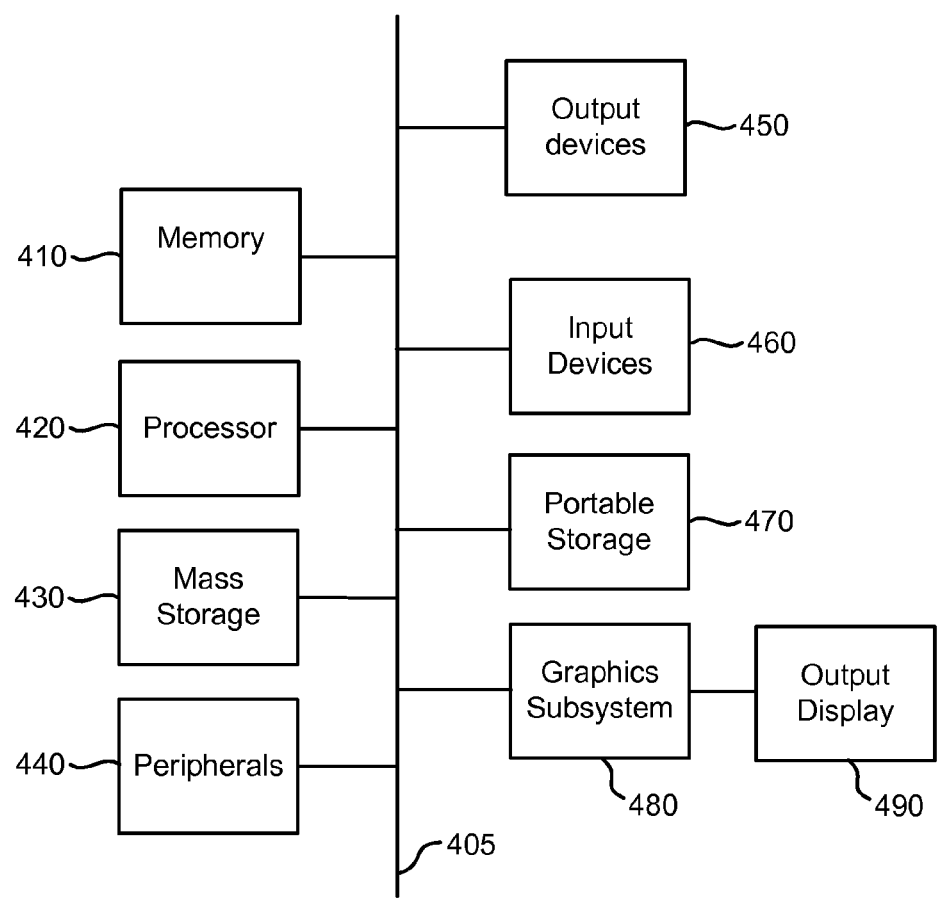
FIG. 4 is a block diagram of an embodiment of a computing system.

FIG. 4 is a block diagram of an embodiment of a computing system for implementing the present technology. In one embodiment, the system of FIG. 4 is used to implement application server 210, enterprise manager 220, workstations 230-240, and database 250.

FIG. 4 illustrates an embodiment of a computing system for use with the present technology. In one embodiment, the computing system illustrated in FIG. 4 may be used to implement application server 210, enterprise manager 220, client device 310, work stations 230-240 and database 250. The computer system of FIG. 4 includes one or more processors 420 and main memory 410. Main memory 410 stores, in part, instructions and data for execution by processor unit 420. If the system of the present invention is wholly or partially implemented in software, main memory 410 can store the executable code when in operation. The system of FIG. 4 further includes a mass storage device 430, peripheral device(s) 440, user input device(s) 460, output devices 450, portable storage medium drive(s) 470, a graphics subsystem 480 and an output display 490. For purposes of simplicity, the components shown in FIG. 4 are depicted as being connected via a single bus 405. However, the components may be connected through one or more data transport means. For example, processor unit 420 and main memory 410 may be connected via a local microprocessor bus, and the mass storage device 430, peripheral device(s) 440, portable storage medium drive(s) 470, and graphics subsystem 64 may be connected via one or more input/output (I/O) buses. Mass storage device 430, which may be implemented with a magnetic disk drive or an optical disk drive, is a non-volatile storage device for storing data and instructions for use by processor unit 420. In one embodiment, mass storage device 430 stores the system software for implementing the present invention for purposes of loading to main memory 410.

Portable storage medium drive 470 operates in conjunction with a portable non-volatile storage medium, such as a floppy disk, to input and output data and code to and from the computer system of FIG. 4. In one embodiment, the system software for implementing the present invention is stored on such a portable medium, and is input to the computer system via the portable storage medium drive 470. Peripheral device(s) 440 may include any type of computer support device, such as an input/output (I/O) interface, to add additional functionality to the computer system. For example, peripheral device(s) 440 may include a network interface for connecting the computer system to a network, a modem, a router, etc.

User input device(s) 460 provides a portion of a user interface. User input device(s) 460 may include an alpha-numeric keypad for inputting alpha-numeric and other information, or a pointing device, such as a mouse, a trackball, stylus, or cursor direction keys. In order to display textual and graphical information, the computer system of FIG. 4 includes graphics subsystem 480 and output display 490. Output display 490 may include a cathode ray tube (CRT) display, liquid crystal display (LCD) or other suitable display device. Graphics subsystem 480 receives textual and graphical information, and processes the information for output to display 490. Additionally, the system of FIG. 4 includes output devices 450. Examples of suitable output devices include speakers, printers, network interfaces, monitors, etc.

The components contained in the computer system of FIG. 4 are those typically found in computer systems suitable for use with the present invention, and are intended to represent a broad category of such computer components that are well known in the art. Thus, the computer system of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 5A:
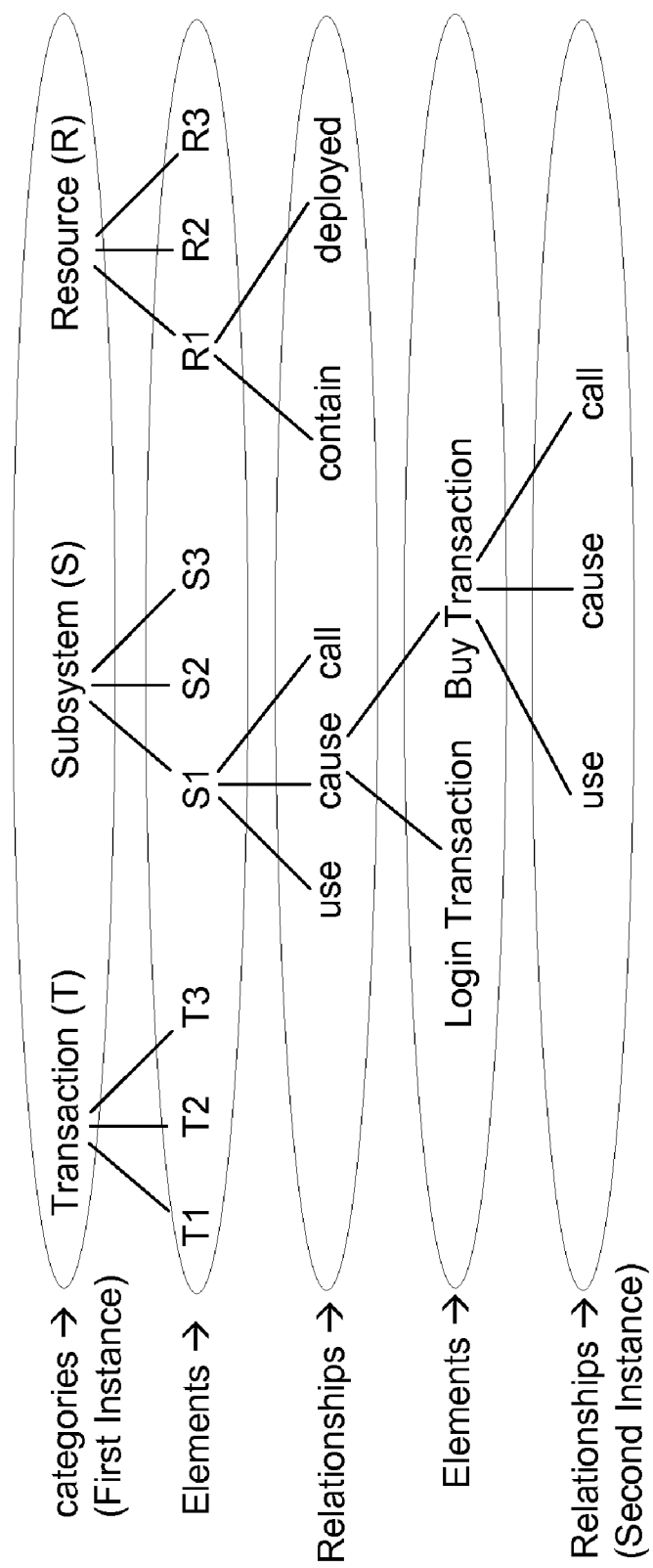
FIG. 5A is an example of a tree representation of interrelated hierarchies within a set of performance data.

FIG. 5A is an example of a tree representation of an integrated hierarchy for a set of performance data. The integrated hierarchy can have a root node of an application, application server, a web service system, or some other entity. The root node is not illustrated in the integrated hierarchy of FIGS. 5A-5E and 11A-11C. The sub-nodes of the root node are categories of transaction, subsystem, and resource. The integrated hierarchy has a sequence of categories, elements, relationships, and elements. Thus, each category node has a number of sub-node elements. The sub-node elements include transactions T1-T3 for the transaction category, subsystems S1-S3 for the subsystem category, and resources R1-R3 for the resource category. Upon selection of any of the category sub-nodes, the corresponding elements are provided to the user through user interface 310.

The next node type in the data tree is relationships. The relationships associated with subsystem S1 are use, cause, and call. Resource R1 has sub-node relationships of contain and deployed. Each relationship node has sub-nodes of elements. For example, the cause relationship has sub-nodes of login transaction and buy transaction. These transactions are caused to occur by subsystem S1. The next level in the data tree is a second instance or occurrence of relationship type nodes. Similar to the first occurrence of the relationships, the second occurrence of relationship type nodes includes categories of use, cause, and call. In one embodiment, the categories do not change from first instance to second instance. Rather, the categories are a template and may be used at any level in the node tree. In some embodiments, the relationships displayed depend on the particular element or category that are displayed. In this case, user interface data model 235 queries data store 305 to determine what relationships exist for the particular element. This is discussed in more detail below.

A representative user experience of navigating through an integrated performance data hierarchy is now discussed. FIGS. 5B-5E represents a user interface which changes as a user navigates through an integrated performance data hierarchy. In one embodiment, the interface examples of FIGS. 5B-5E illustrate navigation through the integrated performance data hierarchy of FIG. 5A.

The interface of FIG. 5B illustrates a set of categories of transaction, subsystem and resource. In one embodiment, the categories correspond to a particular application (not shown in the interface hierarchy). For each category, metrics of average availability ("Av"), average response time ("RT")

and total error count ("ER") are provided. A user may navigate the integrated hierarchy by selecting a category node. Consider a selection of the "subsystem" category, as indicated by the bold text in FIG. 5C. In response to selection of the "subsystem" category, work station 230 queries data processing module 225 for performance data associated with the "subsystem" category. Data processing module queries data store 305 for the corresponding performance data, receives a response, and forwards the response to work station 230. Work station 230 then provides performance data contained in the response in the interface. In this case, work station 230 provides particular subsystems S1, S2, and S3 in the interface of FIG. 5D in response to receiving the selection of the "Subsystem" category. In this case, the category node type has sub-nodes of elements (subsystem category has sub-nodes of subsystem elements).

A user may then select subsystem "S1" of the user interface of FIG. 5C, as indicated in bold. In response to the selection, work station 230 can retrieve relationship data that corresponds to the selected element. As illustrated in FIG. 5D, the retrieved relationship may include "use," "cause," and "call." In one embodiment, user interface data model 235 checks to determine if each of the three relationships appear by quering data store 306 within Enterprise Manager 220. User interface data model 235 interprets the result to figure out which of those categories it display. For example, for the "use" node, it will query user interface data model 235 to see which resources the subsystem S1 uses. If none are returned, then it will know that there are no "use" relationships (it may not display the particular relationship or visually represent it in some way that means there are no "use" relationships). A user may navigate further through the hierarchy by selecting one of the relationships. Selection of the "cause" relationship (as indicated in bold in FIG. 5D) results in display of the transaction elements "login transaction" and "buy transaction" in user interface 310. Thus, the user navigation example illustrated through FIGS. 5B-5E indicates that subsystem "S1" causes transactions "login transaction" and "buy transaction" to be invoked.

Figure 6A:
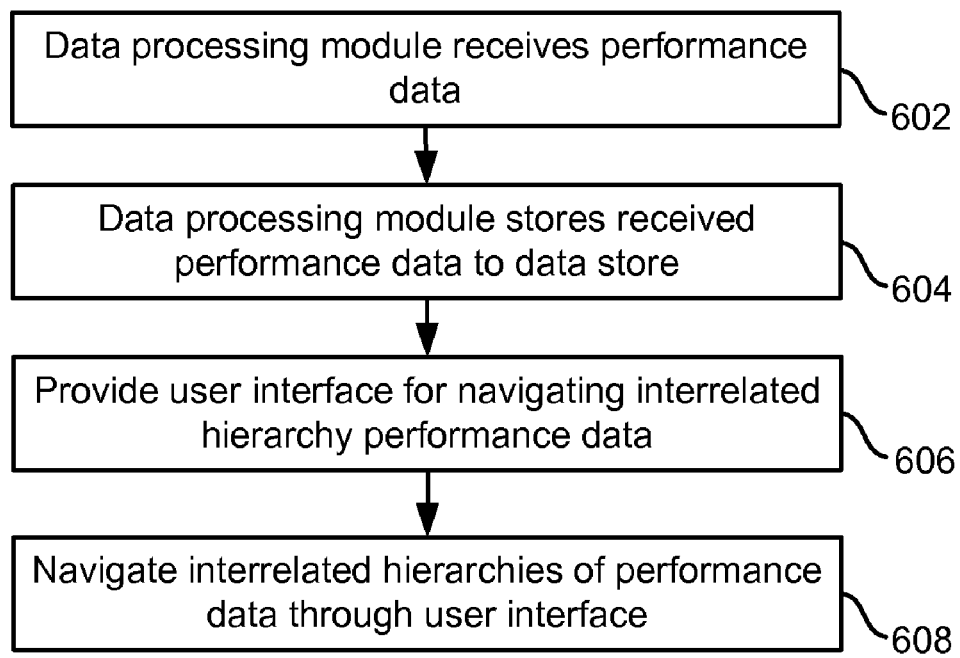
FIG. 6A is a flowchart of an embodiment of a process for providing a user interface for navigating an interrelated hierarchy of performance data

FIG. 6A is a flowchart of an embodiment of a process for providing a user interface for navigating an interrelated hierarchy of performance data. The process of FIG. 6A may be implemented by the system of FIG. 3. First, data processing module 225 of Enterprise Manger 220 receives performance data at step 602. The performance data may be generated by agent 140 from within managed application 130. The performance data is then sent by agent 140 to data processing module 225. The performance data is then stored to data store 305 by data processing module 225 at step 604.

User interface 310 is then provided at step 606. User interface may be provided by work station 230 or some other workstation (e.g., work station 240). Next, a user may navigate through an integrated hierarchy of performance data using user interface 310 at step 608. An example of the integrated hierarchy of performance data is discussed with respect to FIGS. 5B-5E and FIGS. 11B-11C in response to user input or some other event. A user may navigate the integrated performance data hierarchy through user interface 310 to determine relationships between performance data transactions, subsystems and resources. User interface data model 235 provides performance data and the relationships between the performance data in user interface 310 by requesting data from data store 305 and providing the requested data in user interface 310. Navigation of an integrated performance data hierarchy is discussed in more detail below with respect to FIG. 6B.

Figure 6B:
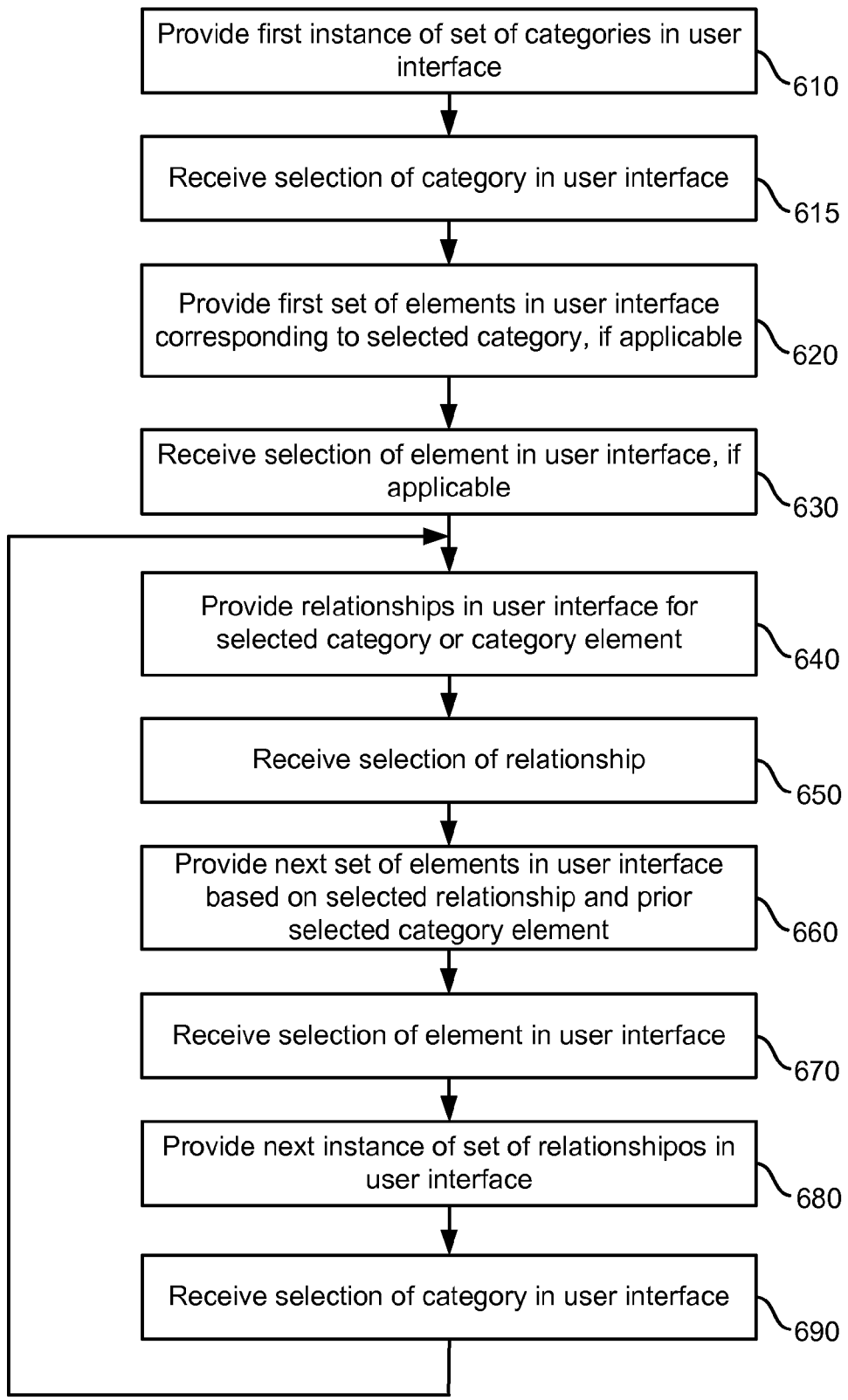
FIG. 6B is a flowchart of an embodiment of a process for navigating interrelated hierarchies of performance data.
Figures 11A, 11B, 11C:
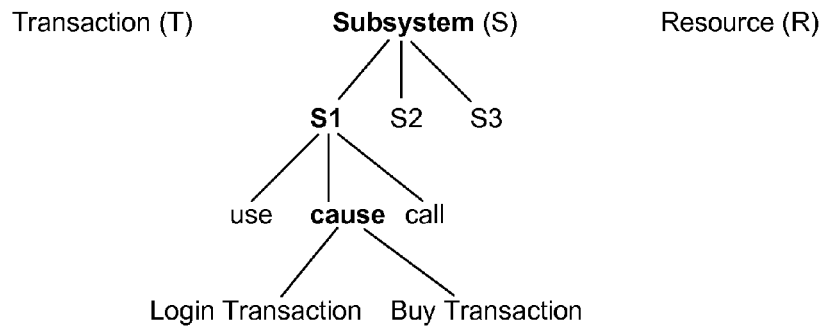
FIG. 11A is an example of a tree representation of a navigated path through interrelated performance data hierarchies.
FIGS. 11B-11C are examples of a user interface for navigating interrelated hierarchies of performance data.

FIG. 6B is a flowchart of an embodiment of a process for navigating an integrated hierarchy of performance data. The process of FIG. 6B provides more detail of step 608 of the process of FIG. 6A and is discussed with reference to the integrated hierarchy of FIG. 5A. Examples of an interface which may be used to navigate and display performance data per the process of FIG. 6B are illustrated in FIGS. 11B and 11C.

A first instance of a set of categories is provided in a user interface at step 610. As discussed above, the set of categories may be provided as sub-nodes to a root node of an application, an application server, a web service system, or some other entity. In one embodiment, user interface data model 235 generates each successive set of nodes in the user interface. In one embodiment, the set of categories is provided from a template of categories. In this case, no query of data store 305 is required to determine the categories. In some embodiments, user interface data model 235 may query data store 305 if data model 235 is missing data required to be displayed. With respect to FIG. 11B, the categories include categories of transaction, subsystem, and resource.

In some embodiments, providing the set of categories may also include providing metric data associated with each category. The metric data may include cumulative data associated with elements contained within each category and viewed as sub-nodes to categories. Examples of the cumulative data include the average transaction time of the elements for each category, the response time for all the elements, and a number of errors over a period of time. The cumulative data can be retrieved from data store 305 by work station 230. In one embodiment, workstation 230 may send a request to data store 305 through data processing module 225 for cumulative data for the categories provided in the user interface.

A selection of a category is received through user interface 310 at step 615. For example, the category selected through the interface of FIG. 11B may be "subsystem." A first set of elements is provided in response to the selection at step 615 in user interface 310 at step 620. In the interface of FIG. 11B, the first set of elements corresponds to the selected category. The element may include transactions, subsystems, or resources which correspond to the selected category (e.g. a number of transactions for a transaction category). In one embodiment, providing the elements includes sending a query to data store 305 by user interface data model 235 of workstation 230. The query identifies the selected category. A response is then received from data store 305, which includes the elements, cumulative data for each element, and optionally other information. With respect to FIG. 11B, the first set of elements for the selected category of "subsystems" is "subsystem 1" (S1) through "subsystem 3" (S3). Providing a first set of elements in a user interface is discussed in more detail below with respect to FIG. 7.

After providing the first set of elements in user interface 310, a selection of an element is received through user interface 310 at step 630. With respect to FIG. 11B, the selected element may be "subsystem 1" (S1). After receiving the selection, relationships are provided in user interface 310 for the selected element at step 640. In one embodiment, user interface data model 235 of workstation 230 constructs a query from the previous selection of the element. The query may identify the selected element as well as the relationships associated with the selected data elements. The query will result in a response sent from data store 305 to data processing module 225, and from data processing module 225 to work station 230. The query response includes relationship information, from which relationships may be provided in user interface 310. With respect to FIG. 11B, the relationships are "use", "cause", and "call". Providing the relationships in user interface 310 is discussed in more detail below with respect to FIG. 8.

A selection of a relationship is received at step 650. With respect to FIG. 11B, the selected relationship may be "cause". Next, another set of elements is provided in user interface 310 at step 660. This set of elements is based on the relationship selected at step 650 and the prior selected element. Thus, the provided set of elements is selected by constructing and sending a query by user interface data model 235 based on the identified data and sending the query to data store 305. Data store 305 receives the query, generates a response, and sends the response to user interface data model 235 of workstation 230. The performance data within the query response is then processed in order to provide elements in the user interface 310. Providing a set of elements as discussed in step 660 is discussed in more detail below with respect to the process of FIG. 9.

In some embodiments, a set of category type nodes may be provided at step 660. User interface data model 235 may display category type nodes if needed to disambiguate the relationship. For example, category nodes could be displayed if a "call" relationship is selected at step 650; the "call" relationship may result in displaying categories of sub-systems or components. If no disambiguation needed (e.g. a "use" relationship is selected at step 650, which typically only affects subsystems), then element type nodes may be displayed regardless of the subsystem.

A selection of a category or an element is received through user interface 310 at step 670. For example, in the interface of FIG. 11B, the "buy transaction" element associated with the "cause" relationship may be selected. Next, a set of categories is provided in user interface 310 in response to the selection at step 670 at step 680. As discussed above with respect to step 610, a template may be used to provide the categories. A query may be made to data store 305 in order to determine cumulative data for each category of this position in the node tree. After providing the categories, a selection of a category is received in user interface 310 at step 690. The process of FIG. 6B then continues to step 640 where the process continues the sequence of node types.

In some embodiments, if element nodes are provided at step 660, a set of corresponding relationships is provided at step 680. The relationships may be provided as discussed above with respect to step 640. In some embodiments, user interface data model may provide a set of relationships as sub-nodes to each set of element nodes.

Figure 7:
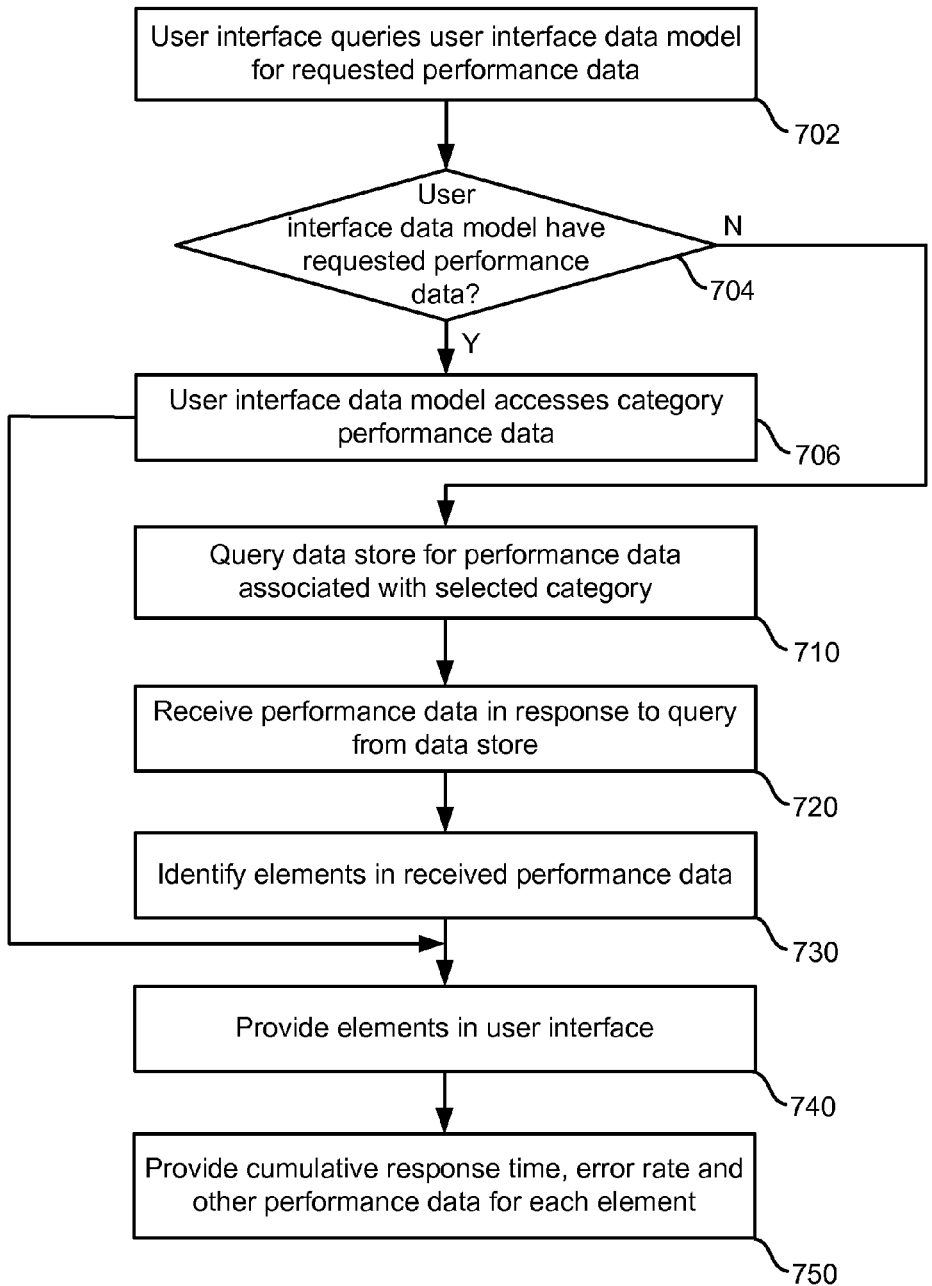
FIG. 7 is a flowchart of an embodiment of a process for providing elements in a user interface.

FIG. 7 is a flowchart of an embodiment of a process for providing elements in a user interface. In one embodiment, the process of FIG. 7 provides more detail for step 620 at FIG. 6B. The process of FIG. 7 begins when user interface 310 queries user interface data model 235 for requested category performance data at step 702. This query is made in response to user interface 310 receiving input from a user which selects a category. A determination is made by user interface data model 235 as to whether the data model has the requested performance data at step 704. User interface data model 235 may have the requested category performance data in a cache memory from a previous query to data store 305, hard coded as a template, or in some other manner. In one embodiment, performance data in user interface data model 235 cache may only be used if it is not too old (e.g., if it was retrieved less than two minutes ago, or some other threshold). If user interface data model 235 has the requested category performance data, user interface data model 235 accesses the category performance data at step 706 and the process continues to step 740.

If user interface data model 235 does not have the requested category performance data, the process of FIG. 7 continues to step 710.

Data store 305 is queried for performance data associated with a selected category at step 710. In the example interface of FIG. 11B, the category selected is "subsystem". Thus, a query can be generated at step 710 for all the performance data associated with the selected "subsystem" category. The query is generated and sent by user interface data model 235 of workstation 230 to data processing module 225. Data processing module 225 receives the query and forwards the query to data store 305. Data store 305 processes the received query, generates a response, and provides the response to data processing module 225. Data processing module 225 forwards the response to user interface data model 235 of workstation 230. At step 720, user interface data model 235 receives performance data in a response to the query sent to data store 305 at step 720.

Elements in the received performance data are identified at step 730. In one embodiment, the performance data contained in the query response received from data store 305 will include elements as well as cumulative data for each element. The elements can be identified by parsing the response or otherwise processing the response received at step 720. Next, the elements identified at step 730 are provided in user interface 310 at step 740. This is illustrated in FIG. 11B as elements S1, S2, and S3; the elements are sub-nodes to the subsystem node. After providing the elements in user interface 310, cumulative data is provided for each element at step 750. In one embodiment, cumulative data includes metric data such as availability, response time and error count for each element. With respect to FIG. 11B, the cumulative data for transaction S1 is an availability of one (indicating that the transaction is fully available or 100%), a response time of 8 seconds, and an error count of 0. The cumulative data may be provided in the response received from data store 305.

Figure 8:
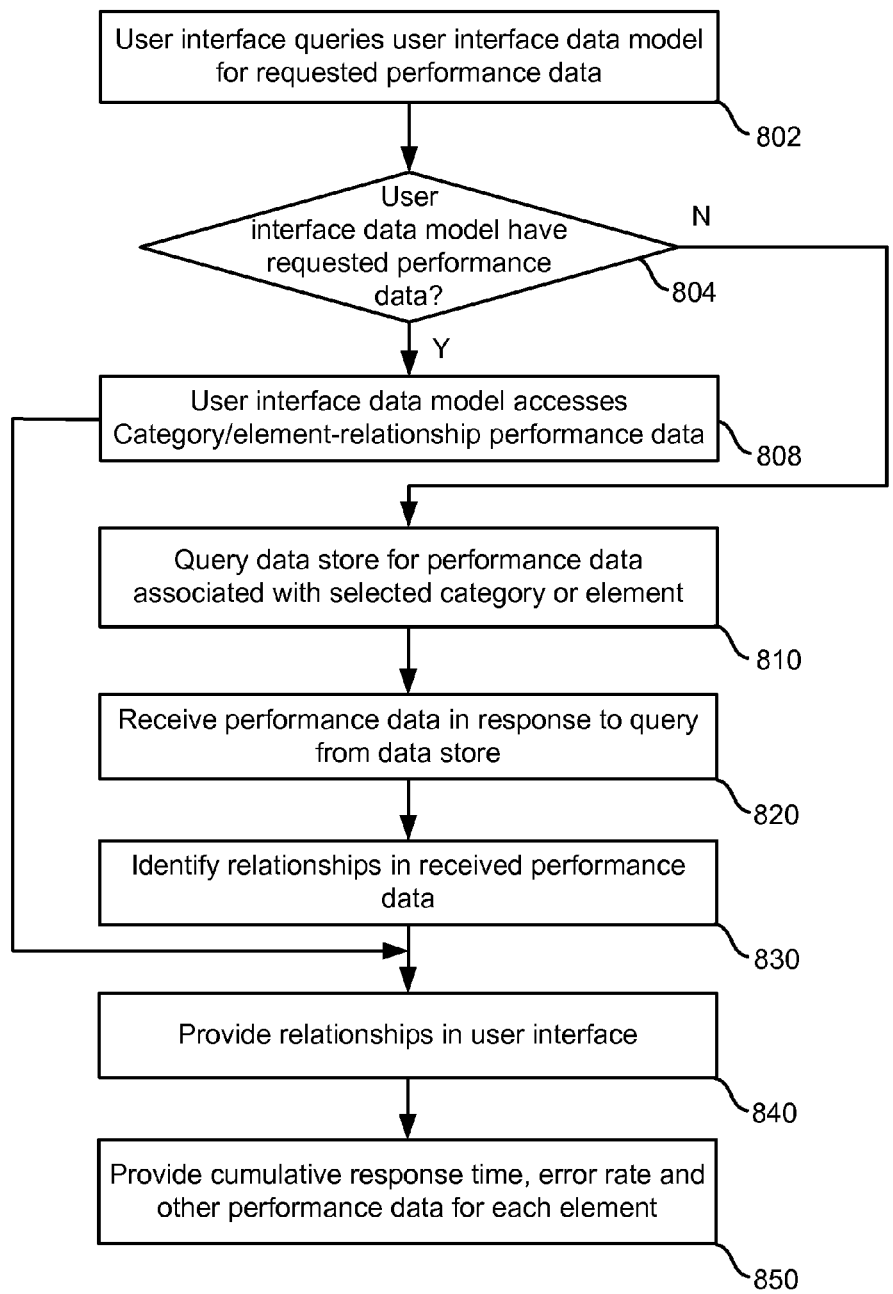
FIG. 8 is a flowchart of an embodiment of a process for providing relationships in a user interface.

FIG. 8 is a flowchart of an embodiment of a process for providing relationships in a user interface. The process of FIG. 8 provides more detail for step 640 of FIG. 6B. First, user interface 310 queries user interface data model 235 for requested relationship performance data at step 802. This query is made in response to user interface 310 receiving input from a user which selects a relationship. A determination is made by user interface data model 235 as to whether the data model has the requested performance data at step 804. User interface data model 235 may have the requested relationship performance data in a cache memory from a previous query to data store 305, hard coded based on the corresponding element type as a template, or in some other manner. In one embodiment, performance data in user interface data model 235 cache may only be used if it is considered fresh, and not too old (e.g., if it was retrieved less than two minutes ago, or some other threshold). If user interface data model 235 has the requested relationship performance data, user interface data model 235 accesses the relationship performance data at step 808 and the process continues to step 840. If user interface data model 235 does not have the requested relationship performance data, the process of FIG. 8 continues to step 810.

Data store 305 is queried for relationship performance data associated with a selected category or element at step 810. In this case, a category or an element has been previously selected in the process of FIG. 6B at step 630 or step 690. Data store 305 is queried through data processing module 225 by user interface data model 235 of work station 230 as discussed above to retrieve performance data for either the selected category or its element. With respect to the interface of FIG. 11B, the selected category is "subsystem". Thus, identification information for a "subsystem" category can be included in the query to data store 305. Data store 305 receives the query, processes the query and sends a query response to user interface data model 235 of workstation 230 through data processing module 225. In some embodiments, one or more queries may be made to data store 305 for each possible relationship that may be provided for the category (or element) selected.

User interface data model 235 of workstation 230 receives the response to the query sent to data store 305 at step 820. The response may include performance data, relationship data, and cumulative data for each relationship. Next, relationships are identified in the performance data contained in the response. In one embodiment, the response is parsed or otherwise processed to identify the relationships contained in the performance data included in the response. With respect to FIG. 11B, the relationships identified may include "use", "cause", and "call". The identified relationships are then provided in user interface 310 at step 840. Next, cumulative data is provided for each element at step 850. In some embodiments, the cumulative data may not be provided for each element, as illustrated in FIG. 11B. Thus, providing cumulative data, as metric data or some other data, is optional.

Figure 9:
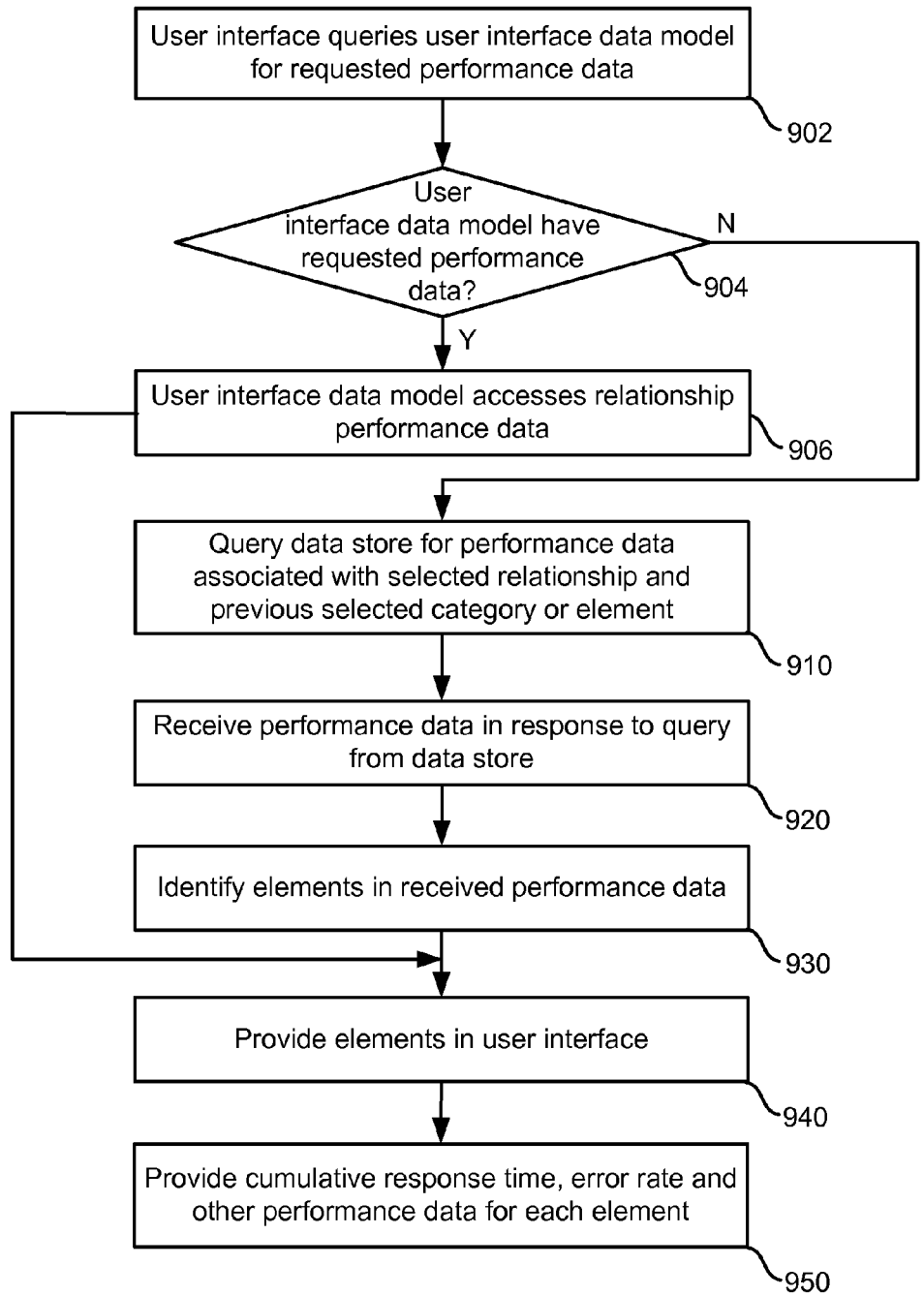
FIG. 9 is a flowchart of an embodiment of a process for providing elements in a user interface.

FIG. 9 is a flowchart of an embodiment of a process for providing elements in a user interface. In one embodiment, the process of FIG. 9 provides more detail for step 660 at FIG. 6B. First, user interface 310 queries user interface data model 235 for requested element performance data at step 902. The elements queried for are associated with the previously selected relationship (selected at step 650) and selected category (selected at step 690) or elements (selected at step 630) during the process of FIG. 6B. After receiving the query, user interface data model 235 determines whether it has the requested performance data at step 904. User interface data model 235 may have the requested element performance data in a cache memory from a previous query to data store 305, hard coded as a template, or in some other format. In one embodiment, performance data in user interface data model 235 cache may only be used if it is not too old. If user interface data model 235 has the requested element performance data, user interface data model 235 accesses the element performance data at step 906 and the process continues to step 940. If user interface data model 235 does not have the requested element performance data, the process of FIG. 9 continues to step 910.

User interface data model queries data store 305 for elements at step 910. As discussed above at step 904, the query is for elements associated with the previously selected relationship and selected category or elements during the process of FIG. 6B. The query to data store 305 may be sent through data processing module 225 by work station 230. Data store 305 receives the query sent by workstation 230, processes the query and sends a query response to workstation 230 data processing module 225.

Elements are received from data store 305 in a query response at step 920. Next, elements are identified from the received query response at step 930. In one embodiment, workstation 230 parses the query response to identify the elements contained therein. Next, the identified elements are provided in user interface 310 at step 940. For example, elements provided in the node tree of FIG. 11B include "login transaction" and "buy transaction". These elements are also provided in user interface 310 of FIG. 11C which incorporates a node path, rather than a node tree. Next, cumulative data is provided in user interface 310 associated with each element at step 950. In some embodiments, the cumulative data may be provided as one or more metrics. For example, in the interface of FIG. 11B, the login transaction has an availability of one, a response time of seven, and an error count of zero. As discussed above, the availability of one indicates that the element is 100% or fully available. Similarly, buy transaction has an average duration of 1, a response time of 1, and an error count of 0.

Figure 10:
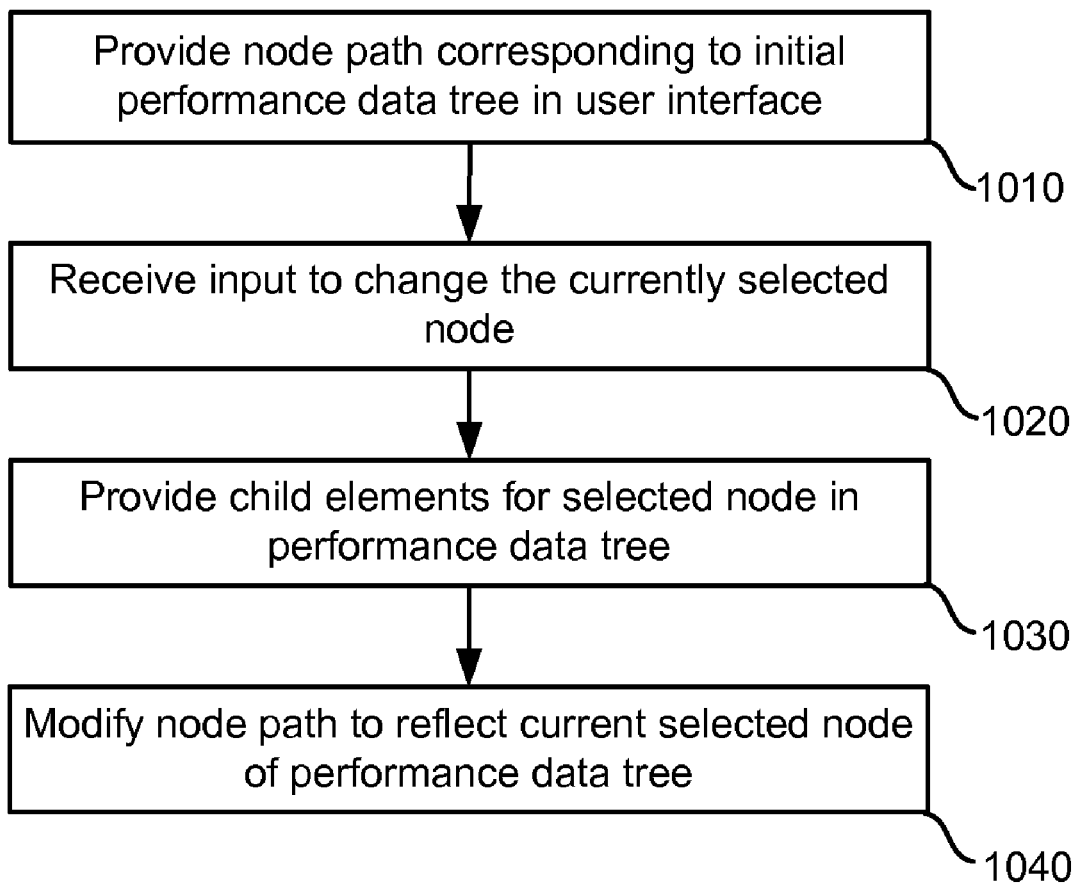
FIG. 10 is a flowchart of an embodiment of a process for providing navigation information in a user interface.

FIG. 10 is a flowchart of an embodiment of a process for providing navigation information in a user interface. In one embodiment, as a user navigates through performance data, a data tree used to represent the data may become cumbersome and inconvenient to use. For example, as a user navigates through the node tree of the interface illustrated in FIG. 11B, the node tree expands to the right, as well as expands down. In some embodiments, a node path can be used to replace a node tree in displaying the path to the current node selected by a user in a performance data space. An example of an interface utilizing a node path is illustrated in FIG. 11C. In particular, the interface in FIG. 11C shows a path node for the performance data node tree of FIG. 11A.

A node path corresponding to the initial performance data tree is provided in user interface 310 at step 1010. In this case, the node path will provide the root node and/or category node. In the example illustrated in FIG. 11C, the selected category is subsystem. As such, the elements of S1, S2, and S3 would then be displayed below the node path. Input is received to change the currently selected node at step 1020. In this case, input may be received selecting an element in the node path or an element displayed below the node path in the interface illustrated in FIG. 11C. Child elements for the selected node are then provided in the performance data tree at step 1030. The elements contained in the sub-node to the selected parent node are provided in the interface of FIG. 11C. The node path is then modified to reflect the current selected node of performance data at step 1040. The node path is changed to add a node level or remove a node level as appropriate according to the selected node.

A user interface of the present technology may implement other features in addition to a node path. For example, user interface 310 may implement a backup feature. Thus, a user may navigate forwards or backwards through a node tree. When a node is selected which is either in reverse of the current node tree path or a different category hierarchy, elements are hidden up to the selected node (e.g., hidden from view or removed from view). Additionally, if a user selects a node in a different hierarchy than currently navigating, the data of the current hierarchy is removed. In some embodiments, in addition to providing layers of nodes to illustrate the hierarchy of a node tree, the nodes may not be identified. This may help save space within an interface for a tree which is expanding within an interface.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A machine implemented method of navigating a set of data, comprising:
   accessing performance data that describes performance of transactions that execute on one or more computing devices;
   displaying a set of categories in a user interface, each category associated with a hierarchy that includes elements pertaining to the category at a first level, relationships at a second level, and elements pertaining to another category at a third level, the relationships define how the elements pertaining to the category at a first level are related to elements pertaining to another category at the third level;
   receiving a selection in the user interface of a first category of the categories;
   displaying a set of relationships associated with the first category;
   receiving a selection of a first relationship in the set of relationships associated with the first category, the first relationship defines how a first element in the first category relates to elements in a second category of the categories;
   generating first performance data from the accessed performance data for the elements in the second category that have the first relationship with the first element in the first category;
   displaying the first performance data in the user interface;
   receiving a selection in the user interface of the second category;
   displaying a set of relationships associated with the second category;
   receiving a selection of a second relationship in the set of relationships associated with the second category, the second relationship defines how a second element in the second category relates to elements in the first category or a third category of the categories;
   generating second performance data from the accessed performance data for the elements in the first category or third category that have the second relationship with the second element in the second category; and
   displaying the second performance data in the user interface.

2. The method of claim 1, wherein the first category includes two or more elements, and the second category includes two or more elements.

3. The method of claim 1, wherein said set of categories include a transaction category, subsystem category, and resource category.

4. The method of claim 1, further comprising:
   identifying the set of relationships associated with the first category based on portions of the performance data that are associated with the first category.

5. The method of claim 1, further comprising:
   identifying a set of relationships associated with the first element based on portions of the performance data that are associated with the first element, and
   displaying the set of relationships associated with the first element in the user interface.

6. The method of claim 5, further comprising:
   identifying metric data for each category, the metric data for each category associated with the elements associated with a particular category.

7. The method of claim 6, wherein the metric data is combined for a category or relationship.

8. One or more processor readable storage devices having processor readable code embodied on said processor readable storage devices, said processor readable
   code for programming one or more processors to perform a method comprising:
   accessing performance data that describes performance of transactions that execute on one or more computing devices;
   displaying one or more categories in a user interface, each category associated with a hierarchy that includes elements pertaining to the category at a first level, relationships at a second level, and elements pertaining to another category at a third level, the relationships define how the elements pertaining to the category at the first level are related to elements pertaining to another category at the third level;
   receiving a selection in the user interface of a first category of the categories;
   displaying a set of relationships associated with the first category;
   receiving a selection of a first relationship in the set of relationships associated with the first category, the first relationship defines how a first element in the first category relates to elements in a second category of the categories;
   generating first performance data from the accessed performance data for the elements in the second category that have the first relationship with the first element in the first category;
   displaying the first performance data in the user interface;
   receiving a selection in the user interface of the second category;
   displaying a set of relationships associated with the second category;
   receiving a selection of a second relationship in the set of relationships associated with the second category, the second relationship defines how a second element in the second category relates to elements in the first category or a third category of the categories;
   generating second performance data from the accessed performance data for the elements in the first category or third category that have the second relationship with the second element in the second category; and
   displaying the second performance data in the user interface.

9. One or more processor readable storage devices according to claim 8, wherein the first element has two or more relationships at the second level of the hierarchy of the first category.

10. One or more processor readable storage devices according to claim 8, further comprising:
    displaying metric data for each category and element displayed in the user interface.

11. One or more processor readable storage devices according to claim 10, wherein the metric data includes response time data.

12. One or more processor readable storage devices according to claim 8, wherein the metric data includes error data.

13. One or more processor readable storage devices according to claim 8, further comprising:
    configuring the hierarchy for each category in response to user input.

14. A machine implemented method, comprising:
    monitoring execution of transactions on one or more computing devices;

generating performance data that describes execution of the transactions;

providing a set of categories in a user interface, each category associated with a hierarchy of data within the performance data, each category includes one or more elements, each hierarchy includes a plurality of levels with elements pertaining to the category at a first of the levels, relationships at a second of the levels, and elements pertaining to another category at a third of the levels, the relationships define how the elements pertaining to the category at the first level are related to elements pertaining to another category at the third level, each hierarchy is associated with the performance data, wherein a first category is associated with a first hierarchy that includes a first element at the first level, a first relationship at the second level, and elements in the second category at the third level, the first hierarchy repeats at an element at the third level that is a descendent of the second element in the second category at the first level;

receiving a first selection of the first category;

providing a first set of one or more elements in the user interface in response to the first selection of the first category, each element of the first set of elements is associated with the first category;

receiving a selection of a first element of the one or more elements;

providing a first set of one or more relationships in the user interface in response to the selection of the first element, each relationship of the first set of relationships links the first element to one or more elements in the second category of the categories;

receiving a selection of the first relationship from the first set of one or more relationships;

determining a second set of one or more elements based on portions of the performance data that indicate that the first relationship exists between the first element and each element of the second set, each element in the second set is associated with the second category;

providing the second set of one or more elements in the user interface in response to the selection of the first relationship;

determining a set of performance data for a first of the one or more elements in the second set based on the hierarchical relationship of the first element in the first category, the first relationship, and the first element in the second category; and displaying the set of performance data for the first of the one or more elements in the second set in the user interface.

15. The method of claim 14, wherein the first set of elements includes two or more elements and the second set of elements includes two or more elements.

16. The method of claim 14, further comprising:
determining that the selected first relationship is associated with a third set of one or more elements based on portions of the performance data that indicate that the first relationship exists between the first element and each element of the third set, each element in the third set is associated with a third category of the categories;
displaying the second category and the third category as child nodes of the first relationship;
receiving a selection of the third category; and
displaying the third set of elements in response to receiving the selection of the third category.

17. The method of claim 14, further comprising:
accessing a first list of elements, the first list of elements associated with processing a request by an application;
accessing a set of two or more of the categories in the user interface, the set of two or more categories associated with one of the elements in the first list;
displaying a second list of elements corresponding to a first set of the performance data associated with one of the two or more categories and the element corresponding to the category; and
accessing a set of one or more relationships, the relationships associated with one of the elements in the second list of elements.

18. The method of claim 14, wherein the categories include transaction, subsystem and resource.

19. The method of claim 14, wherein the relationships include call, cause and use.

20. The method of claim 14, further comprising:
providing cumulative metric data for each element.

21. The method of claim 20, wherein the cumulative metric data includes response time.

22. The method of claim 17, wherein said step of accessing a set of one or more relationships includes:
sending a request to a data store for relationship data associated with an element, the request identifying an element in the second list of elements.

23. The method of claim 17, wherein the element in said request is a subsystem, resource or transaction.

24. The method of claim 1, wherein the first category is associated with a first hierarchy that includes the first element at the first level, the first relationship at the second level, and the elements in the second category at the third level, the first hierarchy repeats at an element at the third level that is a descendent of the second element in the second category at the first level.

25. One or more processor readable storage devices according to claim 8, wherein the first category is associated with a first hierarchy that includes the first element at the first level, the first relationship at the second level, and the elements in the second category at the third level, the first hierarchy repeats at an element at the third level that is a descendent of the second element in the second category at the first level.

* * * * *